US010900384B2

(12) United States Patent
Dumur et al.

(10) Patent No.: US 10,900,384 B2
(45) Date of Patent: Jan. 26, 2021

(54) METHOD AND ARRANGEMENT FOR HEAT ENERGY RECOVERY IN SYSTEMS COMPRISING AT LEAST ONE REFORMER

(71) Applicants: thyssenkrupp Industrial Solutions AG, Essen (DE); thyssenkrupp AG, Essen (DE)

(72) Inventors: Damien Dumur, Dortmund (DE); Denis Krotov, Dortmund (DE); Bernd Brückner, Dortmund (DE); Josef Kurt, Menden (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 163 days.

(21) Appl. No.: 16/334,829

(22) PCT Filed: Sep. 22, 2017

(86) PCT No.: PCT/EP2017/073969
§ 371 (c)(1),
(2) Date: Mar. 20, 2019

(87) PCT Pub. No.: WO2018/055067
PCT Pub. Date: Mar. 29, 2018

(65) Prior Publication Data
US 2020/0018192 A1 Jan. 16, 2020

(30) Foreign Application Priority Data

Sep. 26, 2016 (DE) .......................... 10 2016 218 438

(51) Int. Cl.
F01K 23/10 (2006.01)
C01B 3/34 (2006.01)

(52) U.S. Cl.
CPC .............. *F01K 23/10* (2013.01); *C01B 3/346* (2013.01); *C01B 2203/0216* (2013.01); *C01B 2203/0811* (2013.01); *C01B 2203/0894* (2013.01)

(58) Field of Classification Search
CPC ... C01B 3/346; C01B 3/02; C01B 2303/0805; C01B 2303/0811; F01K 23/10
See application file for complete search history.

(56) References Cited

U.S. PATENT DOCUMENTS 3,441,393 A * 4/1969 Multhaup ............... C01B 3/586
423/359
3,743,488 A * 7/1973 Bogart ....................... C01B 3/38
48/198.7

(Continued)

FOREIGN PATENT DOCUMENTS

AT            410712 B      7/2003
DE      102008056538 A     5/2010
(Continued)

OTHER PUBLICATIONS

English Translation of International Search Report issued in PCT/EP2017/073969, dated Dec. 21, 2017.

*Primary Examiner* — Matthew J Merkling
(74) *Attorney, Agent, or Firm* — thyssenkrupp North America, LLC

(57) ABSTRACT

A method of heat energy recovery in installations including at least one reformer, wherein, for the purpose of heat energy recovery, process condensate is preheated and/or evaporated on a cooling section of the installation by heat exchange with gas generated in the installation, in particular synthesis gas, wherein, prior to being preheated in a flue gas duct of the installation, combustion air is preheated by heat exchange (Continued)

by means of boiler feed water. The invention also relates to a heat energy recovery system for the implementation of the method.

14 Claims, 5 Drawing Sheets

(56) References Cited

U.S. PATENT DOCUMENTS

| | | | |
|---|---|---|---|
| 3,980,452 A | 9/1976 | Krumm | |
| 4,213,954 A * | 7/1980 | Pinto | C01C 1/0405 423/359 |
| 4,264,567 A * | 4/1981 | Pinto | C01B 3/34 252/373 |
| 4,897,999 A | 2/1990 | Varney | |
| 4,959,079 A * | 9/1990 | Grotz | B01J 8/062 252/373 |
| 6,258,860 B1 * | 7/2001 | Weedon | C07C 29/1518 518/706 |
| 8,496,908 B1 * | 7/2013 | Genkin | F23G 7/07 423/651 |
| 8,956,587 B1 * | 2/2015 | Peng | C01B 3/384 423/650 |
| 2005/0176831 A1 * | 8/2005 | Inui | F02C 3/22 518/703 |
| 2007/0237710 A1 | 10/2007 | Genkin | |
| 2008/0243310 A1 | 10/2008 | Esposito | |
| 2009/0230359 A1 * | 9/2009 | Guvelioglu | C01B 3/48 252/373 |
| 2009/0242841 A1 * | 10/2009 | Judas | C01B 3/38 252/373 |
| 2011/0085967 A1 * | 4/2011 | Raybold | C01B 3/382 423/652 |
| 2011/0239864 A1 | 10/2011 | Marty | |
| 2012/0039794 A1 * | 2/2012 | Catchpole | C01B 3/382 423/653 |
| 2013/0000320 A1 * | 1/2013 | McKenna | F01K 23/10 60/780 |
| 2013/0213489 A1 | 8/2013 | Von Trotha | |
| 2016/0281975 A1 | 9/2016 | Gasparini | |

FOREIGN PATENT DOCUMENTS

| | | |
|---|---|---|
| DE | 102010044939 B | 12/2011 |
| EP | 2103569 A | 9/2009 |
| EP | 2233433 A | 9/2010 |
| RU | 2520475 C | 6/2014 |

* cited by examiner

METHOD AND ARRANGEMENT FOR HEAT ENERGY RECOVERY IN SYSTEMS COMPRISING AT LEAST ONE REFORMER

CROSS REFERENCE TO RELATED APPLICATIONS

This application is a U.S. National Stage Entry of International Patent Application Serial Number PCT/EP2017/073969, filed Sep. 22, 2017, which claims priority to German Patent Application No. DE 10 2016 218 438.5, filed Sep. 26, 2016, the entire contents of both of which are incorporated herein by reference.

FIELD

The present disclosure generally relates to a method and a system for heat energy recovery in installations comprising at least one reformer.

BACKGROUND

Downstream of reformers, in particular during steam reforming processes, for example for the production of hydrogen, ammonia, or synthesis gas, efforts are being made for heat energy to be used as extensively as possible, in particular for the purpose of increasing the energy efficiency of an overall installation. However, an effective or efficient use of in particular low-calorific energy or heat especially in synthesis gas installations is not easy to realize in many cases, in particular owing to high investment required for this purpose.

US patent application 2013/0213489 A1 describes a method and an arrangement for generating process steam and boiler feed water steam in a heatable reformer for producing synthesis gas. Patent document DE 10 2010 044 939 B3 also describes such an arrangement, wherein, prior to the conversion of carbon monoxide, the heat of the generated synthesis gas is used for evaporating the process condensate, and wherein supplying the process condensate with heat energy by means of a heat exchanger is proposed, which heat exchanger is arranged downstream of the reformer and upstream of a high-temperature conversion unit.

U.S. Pat. No. 4,897,999 A describes a steam power plant having multiple turbines, and having multiple heat exchanger stages in a flue gas duct for heat exchange with condensate/water, and having multiple heat exchanger stages in a furnace gas supply duct. The publications U.S. Pat. No. 3,980,452 A, US 2011/0239864 A1, EP 2 103 569 A2, US 2008/0243310 A1, EP 2 233 433 A1 and US 2007/0237710 A1 describe further arrangements for gas conducting or for heat exchange, in particular in connection with production of synthesis gas.

Thus a need exists for a method or an arrangement having the disclosed features, by way of which the energy efficiency of installations operated in conjunction with reforming processes can be increased. In particular, the use of heat energy or low-calorific energy is intended to be realizable such that noticeable processing advantages arise and the energy use concept also provides incentives in financial terms.

DETAILED DESCRIPTION

Figure 1A:
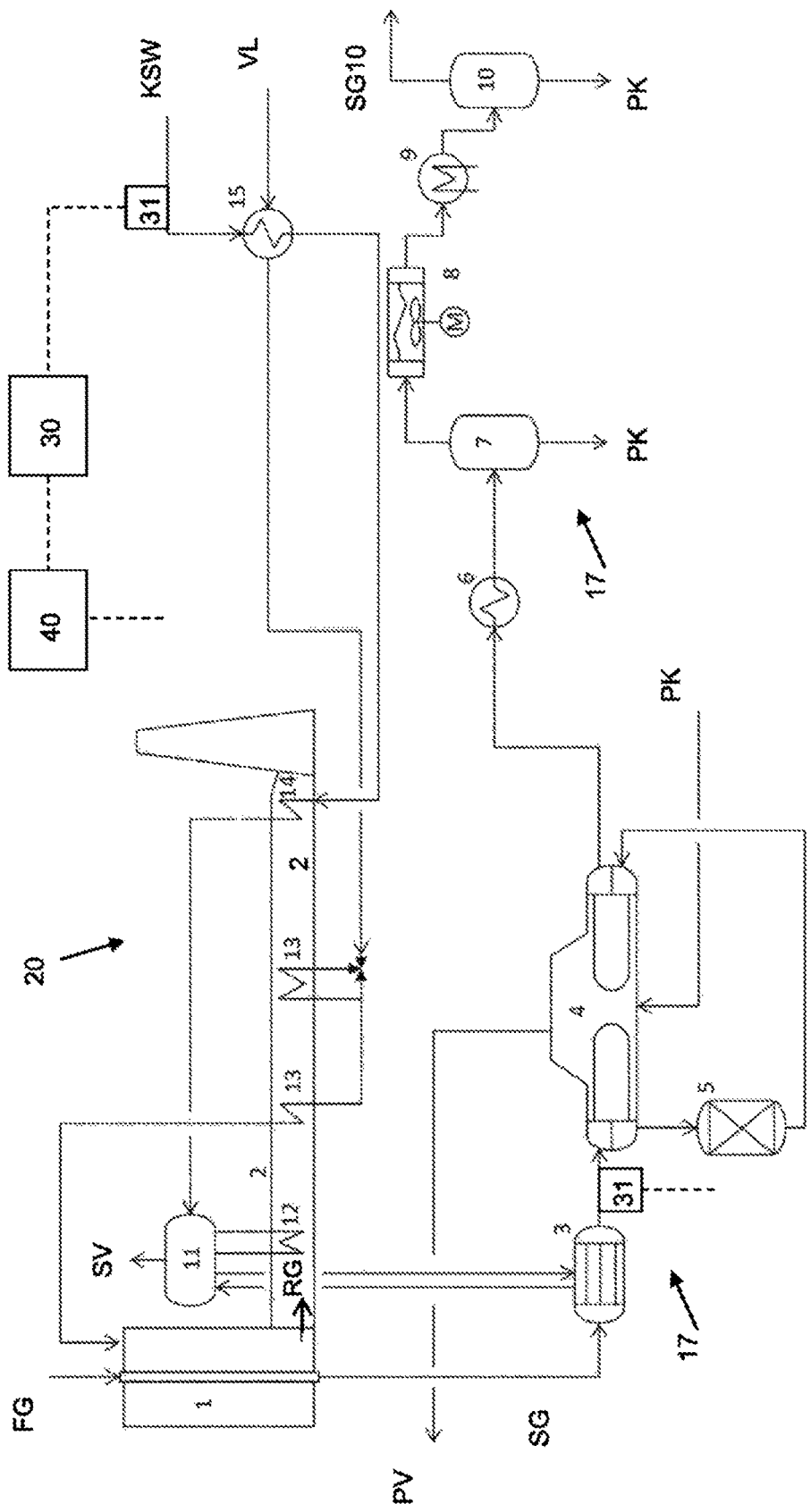
FIG. 1A is a schematic view of a heat recovery arrangement according to one of the exemplary embodiments or the interconnection thereof with an installation.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a method and an arrangement for heat energy recovery in installations comprising at least one reformer, in particular in synthesis gas installations having steam reforming means, in which installations at least the following process streams of the installation are inter-connected: combustion air for the reformer, boiler feed water for steam generation, process condensate on a cooling section of the installation, and flue gas from the reformer, wherein the flue gas and the combustion air are conducted through a flue gas duct in which heat energy recovery is realized.

In some examples, a method for heat energy recovery in installations may include at least one reformer. In particular, synthesis gas installations having steam reforming means, in which installations at least the following media or process streams of the installation are interconnected: combustion air (VL) for the reformer, boiler feed water (KSW) for steam generation, in particular in a steam drum of the installation, process condensate (PK) on a cooling section of the installation, which process condensate can be separated from synthesis gas, and flue gas (RG) from the reformer; wherein at least partial evaporation of the process condensate is realized on the cooling section; wherein the flue gas is discharged through a flue gas duct in which heat energy recovery is realized; and wherein the combustion air is conducted through the flue gas duct prior to being supplied to the reformer for the purpose of heat energy recovery; wherein it is proposed that, that, for the purpose of heat energy recovery, the process condensate is preheated and/or evaporated, in particular exclusively, on the cooling section by heat exchange with gas generated in the installation, in particular synthesis gas (or cracking gas or process gas), and that, prior to being preheated in the flue gas duct, the combustion air is preheated by heat exchange by means of the boiler feed water. This facilitates the utilization of heat energy present, in particular low-calorific heat, in particular also in conjunction with cost reductions in terms of device components (heat exchangers) or with regard to the process. In particular, a reduction in the number of apparatuses, or the size thereof, and consequently a reduction in the investment costs can be made possible.

Low-calorific heat of the boiler feed water can be used for preheating the combustion air. Furthermore, the cooled boiler feed water can here be heated against relatively cold flue gas, in particular at the end of the flue gas duct. It has been found that the interconnection according to the invention allows a more efficient use of low-calorific energy of the boiler feed water or of the flue gas. Heat exchange between boiler feed water and combustion air, in particular as a first heat exchanger stage, allows flexible, differing interconnections or multiple variants of the arrangements described below, in order to make efficient use of waste heat. In particular, it has proven here to be advantageous for the complete process condensate (PK) evaporation to be realized in or on the cooling section of the synthesis gas installation. In this way, it is possible for example to dispense with a PK drum or steam drum. The evaporation can be realized in a single or multiple apparatuses. It has been found that use may be made of such a heat energy recovery arrangement in particular in a synthesis gas/hydrogen installation having a two-steam system.

In hydrogen/synthesis gas installations having a steam system, boiler feed water from a battery limit is mixed together with process condensate from the synthesis gas in a drum. In a two-steam system, these process streams are evaporated separately.

On the one hand, the optimization may be realized on the cooling section, on the other hand it may be realized on the flow path of the boiler feed water and of the combustion air prior to the supply thereof or passage thereof through the flue gas duct. According to one of the exemplary embodiments, the flow path of the boiler feed water may also be guided via the cooling section, as will be described in more detail.

In this case, further preheating is possible for the process condensate on the cooling section and for the optionally already preheated boiler feed water (KSW) in the flue gas duct. Optionally, it is also possible for the boiler feed water to be preheated partially on the cooling section prior to it being heated further in the flue gas duct, in particular by means of at least one economizer.

It becomes apparent from these considerations that the preheating of the combustion air against boiler feed water provides a multitude of options for the efficient use of heat energy. It has been found that, for high efficiency, the heat for the boiler feed water may be used or removed at multiple locations, wherein, regardless of this, an/the economizer is arranged as far as possible at the end of the flue gas duct.

By means of the interconnection according to the invention, it is possible to provide in particular in hydrogen installations a standardizable arrangement for the efficient use of process energy, in particular in connection with the production of synthesis gas.

In other words: A particularly promising energy use concept is realizable through individual features or a combination of the following features.

1/ Process condensate preheating/evaporation on the cooling section, in particular complete; and/or
2/ combustion air preheating by heat exchange with boiler feed water; and/or
3/ preheating of the combustion air against boiler feed water especially in a first heat exchanger stage upstream of optional additional heat exchanger stages; and/or
4/ boiler feed water preheating, in particular following heat exchange with combustion air; and/or
5/ installation/arrangement of at least one economizer internally in the flue gas duct, for the heat exchange with boiler feed water and for relieving the burden on internal (combustion) air preheaters.

These measures may be implemented individually or in combination in accordance with standardized specifications according to installation configuration. Here, in particular, the reduction in size of heat exchanger surfaces in the flue gas duct (in particular in the case of multiple air preheaters arranged internally in the flue gas duct) is made possible, accompanied by cost savings regarding installation components.

It has also been found that the following interconnection aspects can make the energy use concept described here particularly efficient, in particular also in combination with one another:

A/ Process condensate is evaporated (prior to and/or following CO conversion) exclusively in or on the cooling section of the (synthesis gas) installation. This may be realized for example in two separate apparatuses, or in a single special boiler evaporator which consists for example of two heat exchanger bundles.

B/ Fresh combustion air is preheated in at least one calorifier (external air preheater). In this case, the boiler feed water is used and cooled as a heat medium, in particular in series in at least two calorifiers connected in series or calorifiers which are flowed through in series by the boiler feed water or by combustion air.

C/ The heating of the boiler feed water is realized in the flue gas duct (in particular in an economizer), in particular at multiple locations, preferably at the end of the flue gas duct. Optionally, supplying of heat on the cooling section to the boiler feed water which has been cooled by the heat exchange with combustion air is additionally realizable, in particular in a KSW preheater charged with synthesis gas, before said water is conducted to a steam drum of the installation.

Furthermore, according to the invention, the following measures may also be implemented, again in each case individually or in combination:

D/ The cooled boiler feed water is divided into two streams, wherein the first partial stream is conducted to the/at least one economizer in the flue gas duct and the second partial stream is conducted to the KSW preheater on the cooling section (parallel interconnection for heating of the boiler feed water).

E/ Use of two calorifiers, wherein the cooled boiler feed water exiting the first calorifier is reheated and then conducted to the second calorifier.

Here, the further heating of the already preheated boiler feed water can be realized in the flue gas duct in a largely freely definable manner according to installation configuration. For the case that use is to be made of multiple calorifiers, it is possible for these to be interconnected or arranged in a largely arbitrary manner.

The interconnection according to the invention, in particular the specific arrangement of the at least one calorifier, also allows the flue gas exit temperature at the chimney or at the end of the flue gas duct to be reduced without a noticeable increase in investment costs, in particular also in conjunction with economizers. In particular, it has been found that an economizer arranged at the end of the flue gas duct allows greater efficiency and/or cost-effectiveness than an internal air preheater, even for the case in which the temperature difference (pinch value) is less than in the case of an air preheater in the form of a conventional plate-type heat exchanger.

Furthermore, operation is possible at higher flue gas temperatures for further or all the other sections of the flue gas duct or for bundles or heat exchangers arranged in the flue gas duct, which leads to greater temperature differences and thus more efficient heat transfer (in particular with the internal air preheaters), and whereby the investment costs can be reduced.

The process condensate evaporation may be realized on the cooling section, in particular exclusively. Thus, it is not necessarily the case that a process condensate evaporator is present in the flue gas duct. Therefore, a steam drum for the process condensate is also not required.

It has been found that further advantages in terms of installation technology can arise if use is made of an evaporator of double bundle boiler evaporator type as an evaporator for the synthesis gas. In this way, in particular in comparison with a circulating system boiler having a separate drum, investment costs can be further reduced. The preheating of the process condensate in the flue gas duct still remains possible irrespective of the type of evaporator. In this respect, it may also be mentioned that, with many installation configurations, evaporation of the process condensate exclusively on the cooling section and in conjunction with a design of both PK evaporators as a common component having a single steam chamber and two bundles promises maximum advantages in terms of energy. Optionally, process condensate may also be evaporated partially in the flue gas duct and/or both PK evaporators may also be provided as separate apparatuses. However, with many installation configurations, it would not be possible to obtain the same advantages in terms of energy as in the case of evaporation exclusively on the cooling section in the combined PK evaporator.

It has been found that, by way of targeted configuration or selection of interconnection paths for boiler feed water and process condensate, and of air preheating paths, a highly efficient and/or cost-effective installation configuration is able to be realized.

Here, a cooling section is preferably to be understood as being a section of the overall installation or arrangement on which synthesis gas is cooled and water or process condensate is to be separated from the synthesis gas, wherein as much energy as possible is to be recovered from the synthesis gas, for example by heat exchangers arranged on the cooling section. The cooling section extends in particular downstream from the reformer to the process condensate separating means in a last one of multiple separators, before the synthesis gas is conducted further to a pressure swing adsorption unit.

Here, a flue gas duct is preferably to be understood as being a flue gas removal means which leads to a chimney, or comprises the latter, and is intended for removing from the installation the flue gas generated by the installation.

According to one embodiment, heat transfer from the boiler feed water to the combustion air is realized in that the boiler feed water and the combustion air are conducted through at least one external air preheater, or calorifier, arranged externally with respect to the flue gas duct, before the boiler feed water is conducted to the flue gas duct, in particular to the/an economizer arranged therein, or is conducted further to a steam drum. The use of one or more heat preheaters/calorifiers allows great flexibility with the interconnection. In this case, the at least one calorifier may optionally be connected to/interconnected with an external KSW preheater or be independent thereof. In other words: The boiler feed water can be supplied directly, or supplied via a KSW preheater, to the at least one calorifier, wherein the KSW preheater can form the first heat exchanger stage or optionally also a second heat exchanger stage for the boiler feed water.

In other words: The boiler feed water is firstly conducted through a calorifier, wherein combustion air is preheated, before it is conducted to the/an economizer, or to a KSW preheater in the form of an economizer, in the flue gas duct. With certain installation configurations, it may be even more effective in terms of energy for the boiler feed water to be conducted through (at least) two calorifiers with one or more KSW preheaters arranged/each arranged therebetween. This or at least one of these KSW preheaters may optionally be placed in the flue gas duct (in particular as the second of two economizers). It has been found that, irrespective of the arrangement or number of economizers, a particularly noticeable advantage in terms of energy is obtained if, immediately prior to introducing the boiler feed water into an economizer/the economizer arranged last (with respect to the direction of the flue gas stream in the flue gas duct), that is to say the economizer arranged furthest downstream, the boiler feed water is conducted through a calorifier for air preheating.

In this case, a calorifier is to be understood as being a heat exchanger for air preheating, which is arranged in the air duct or integrated in the air flow path. Here, as a synonym for the term "calorifier", the term "external air preheater" (external=externally with respect to the flue gas duct) may also be used.

According to one embodiment, the boiler feed water is conducted via a KSW preheater or economizer, which is arranged internally in the flue gas duct and is preferably arranged at the end of the flue gas duct. In this way, it is possible for a large quantity of heat to be absorbed by the boiler feed water, specifically at a location of the flue gas duct at which the flue gas still has a relatively high heat content. The heat content of the flue gas does not therefore necessarily have to be absorbed by internal air preheaters. This gives rise to further variation possibilities for the use of the waste heat. For example, it has been found that an arrangement of at least one economizer at the end of the flue gas duct can lead to all the other heat exchanger bundles arranged in the flue gas duct being of more slender form since, for these, larger temperature differences with respect to the flue gas (RG) can be used.

In particular, the process control may be realized such that the boiler feed water is conducted into the economizer in a warmer state or with a higher heat energy content than for example combustion air, whereby the problem of undershooting of the sulfuric acid dew point on the flue gas side, which has hitherto occurred frequently, can also be avoided.

It has been found that the temperature difference (T pinch) between the flue gas and the boiler feed water conducted through an/the economizer has a decisive influence on the design of the energy use concept, and that the enlargement of this T pinch can have decisive advantages. In order to enlarge this T pinch, prior cooling of the boiler feed water in a calorifier by air preheating is proposed here.

Preferably, an economizer used is relatively large or is dimensioned for high energy exchange, with the result that the economizer is able to remove a considerable quantity of energy from the flue gas duct. In this context, evaporation of the process condensate exclusively on the cooling section (process path) is particularly efficient.

Here, an economizer is preferably to be understood as being a heat energy exchange device for introducing energy into feed water, which is designed or optimized for transferring energy of (flue) gas to the feed water at relatively low temperatures of the gas, in particular at temperatures of flue gas of a synthesis gas installation, in particular in a region or section in front of a chimney, that is to say when the flue gas has already cooled downstream of the reformer. In particular an economizer is to be understood as being a KSW preheater arranged in the flue gas duct, through which preheater flue gas/waste gas flows. Here, the preheating may be realized in particular to the saturation temperature.

According to one embodiment, in the flue gas duct, the flue gas is conducted through at least one air preheater, which is arranged internally in the flue gas duct and is arranged upstream of the/a KSW preheater, or economizer, arranged internally in the flue gas duct. With the use of previous and new installation components, this can give rise to synergy effects.

Here, an internal air preheater is to be understood as being a heat exchanger, or heat exchanger bundle, which is arranged in the flue gas duct and is designed or optimized for heat exchange between two gases, especially flue gas and combustion air.

According to one embodiment, the preheating or evaporation of the PK, preferably completely or exclusively, on the cooling section is realized in a boiler evaporator, which comprises two heat exchanger units and a common steam chamber. In this way, efficient use of heat can be realized. Moreover, expenditure in terms of apparatus can be saved.

According to one embodiment, the boiler feed water is heated in at least one external KSW preheater before it is conducted, in particular via a further external air preheater or calorifier, to the flue gas duct, in particular in a KSW preheater arranged on the cooling section by means of process gas or synthesis gas. This allows a link of the heat energy use on the cooling section and on the flow path of the boiler feed water to be realized. In other words: Following heat exchange with the combustion air, the boiler feed water is preheated before it is conducted via the flue gas duct. The boiler feed water can in the process/thereafter be conducted to an/the economizer arranged internally in the flue gas duct, in particular immediately after it leaves the further calorifier.

Here, an external KSW preheater is preferably to be understood as being a heat exchanger which is arranged externally with respect to the flue gas duct and which is configured for heat exchange between boiler feed water and an in particular gaseous fluid, especially synthesis gas. The fluid or synthesis gas may also in this case comprise liquid constituents which are able to be condensed out, in particular water. The KSW preheater may, for example, be designed in the form of a tube bundle heat exchanger and subjected to heat by way of synthesis gas.

According to one embodiment, downstream of the (first) external air preheater or calorifier, the boiler feed water is subdivided into two parallel partial streams for the purpose of preheating the boiler feed water, specifically into a partial stream to the/a KSW preheater, or economizer, arranged internally in the flue gas duct, and into a partial stream to the external KSW preheater, in particular on the cooling section. This allows the heating of the boiler feed water to be realized in two ways in a particularly flexible manner according to operating state.

According to one embodiment, the cooled boiler feed water exiting the/a first external air preheater or calorifier is reheated and then conducted to a further external air preheater or calorifier, in which heat exchange with the combustion air is again realized. This allows the combustion air to be preheated in an even more efficient manner, in particular with the interposition of a preheating stage for the boiler feed water. Here, the reheating of the boiler feed water can be realized on the cooling section or in the flue gas duct in a largely arbitrary manner. For the case of multiple calorifiers, it is possible for these to be interconnected or arranged in a largely arbitrary manner.

According to one embodiment, the KSW preheater is a heat exchanger which is arranged on the cooling section and via which the gas generated in the installation, in particular synthesis gas, is conducted. In this way, the cooling section and the supply of boiler feed water or combustion air can be thermally linked to one another. The heat energy can then be used in a particularly flexible or efficient manner.

According to the invention, the aforementioned object is also achieved by way of a logic unit configured for the implementation of an above-described method, and configured for the control of volumetric flow rates or for the switching of installation components at at least one external air preheater, or calorifier, through which the boiler feed water and combustion air are conducted for preheating the combustion air. This results in advantages mentioned above.

According to the invention, the aforementioned object is also achieved by way of a heat energy recovery arrangement for installations comprising at least one reformer, in particular for synthesis gas installations having steam reforming means, in which installations at least the following media or process streams of the installation are interconnected: combustion air for the reformer, boiler feed water for steam generation, in particular in a steam drum of the installation, process condensate on a cooling section of the installation, and flue gas from the reformer, which flue gas is discharged through a flue gas duct; wherein the heat energy recovery arrangement comprises: at least one air preheater, or calorifier, for the combustion air, which is arranged externally with respect to the flue gas duct; at least one heat exchanger for the process condensate or the boiler feed water; wherein a heat exchanger for the process condensate is arranged on the cooling section and is configured for heat energy recovery, in particular exclusively, by way of heat exchange with gas generated in the installation, in particular synthesis gas, and in that the external air preheater or calorifier is configured and arranged for heat exchange between the boiler feed water and the combustion air prior to the preheating thereof in the flue gas duct. This results in advantages mentioned above.

According to one exemplary embodiment, the heat exchanger for the process condensate is a boiler evaporator, which comprises two bundles and a (single) common steam chamber.

According to one exemplary embodiment, at least one KSW preheater or economizer is arranged internally in the flue gas duct, in particular in a position as far downstream as possible, in particular at the end of the flue gas duct, which KSW preheater is arranged in the flow path of the flue gas. This results in advantages described above.

According to one exemplary embodiment, a further calorifier is arranged upstream of the internal KSW preheater or economizer. In particular, the arrangement comprises a KSW preheater arranged on the cooling section, which is configured for heat exchange between the boiler feed water and process gas or synthesis gas, in particular downstream of the external (first) air preheater. As mentioned, this allows the combustion air to be heated even more efficiently, in particular by coupling the supply of the combustion air or of the boiler feed water to the cooling section. Some of the advantages described here can already be realized by the arrangement described of at least one calorifier and the economizer at the end of the flue gas duct. Since both the preheating of the combustion air and the evaporation of the process condensate are realizable on the cooling section, with evaporation of the process condensate in particular exclusively and completely by way of synthesis gas, the process condensate system may be of relatively compact form and simple construction, in particular with expedient setup and clear piping arrangement, and/or steel design.

According to the invention, the aforementioned object is also achieved by way of the use of a heat energy recovery arrangement in installations comprising at least one reformer, in particular an above-described heat energy recovery arrangement, for the preheating of combustion air by means of boiler feed water upstream of a flue gas duct of the installation by means of at least one external air preheater, arranged externally with respect to the flue gas duct, before the combustion air is conducted into or via the flue gas duct, in particular in conjunction with preheating of the boiler feed water by means of process gas on a cooling section of the installation, in particular during steam reforming processes, in particular in a synthesis gas/hydrogen installation having a two-steam system. This results in advantages described above. The use may in particular also be realized during steam reforming processes in a synthesis gas/hydrogen installation having a one-steam system.

For reference signs which are not described explicitly with respect to a single figure, reference will be made to the in each case other figure.

FIG. 1A shows an arrangement 20 having a calorifier 15 and having an economizer 14 which is arranged at the end of a flue gas duct 2 of a synthesis gas installation. Gas FG is fed to a reformer 1 and is split into a process gas stream SG and a steam fraction. A flue gas stream RG is formed during the combustion of fuels with combustion air VL. Boiler feed water KSW is conducted through the calorifier 15 in heat exchange with combustion air VL. In particular, the boiler feed water passes from the battery limit or from a water treatment unit or from a deaerator/stripper to the calorifier 15. The boiler feed water which is cooled by heat exchange with the combustion air is then reheated in the economizer 14 at the very end of the flue gas duct and finally conducted to a steam drum 11, from which saturated steam SV is removed. The steam drum 11 is connected to a KSW evaporator 12 arranged in the flue gas duct 2. With certain installation configurations, it is also possible for this KSW evaporator 12 to be omitted. Upstream of the economizer 14 and downstream of the KSW evaporator 12, there are arranged two or more internal air preheaters 13, which, owing to the economizer 14, are able to be operated at relatively high flue gas temperatures, this contributing to cost reductions.

An evaporator 4 for process condensate PK is arranged on the cooling section 17, from which evaporator process steam PV is removed. The PK evaporator 4 comprises two heat exchangers/bundles, which can, in a common drum or a common steam chamber, make possible the PK evaporation in a single apparatus. Upstream thereof, process gas or synthesis gas SG is conducted from the reformer 1 via a gas cooler 3. Downstream of the first bundle, synthesis gas is conducted to a CO shift reactor 5 or to a water-gas shift reaction arrangement. This may comprise an HTS (high temperature shift) means or MT (medium temperature) shift means or HT-LT (low temperature) shift means. A CO shift reaction (or water-gas shift reaction) causes the synthesis gas temperature to increase again, it being possible for use to be made of this by the second bundle in the evaporator 4 for PK evaporation. This results in advantages, such as for example saving of material, smaller required steam chamber, fewer pipelines, and less measurement/control equipment, in particular since no interconnection of multiple separate evaporators is necessary.

Arranged downstream of the evaporator 4 is at least one external heat exchanger 6, via which the process gas SG can be conducted. Said at least one heat exchanger 6 may be used for different purposes according to the installation configuration. Here, as exemplary types of heat exchangers 6 in this arrangement, mention can be made, non-exhaustively, in particular of: fuel preheater, steam generator, input gas (feed) preheater, PSA offgas preheater, KSW preheater, PK preheater.

The first and second separators 7, 10 shown in FIG. 1A, which are arranged on a cooling section 17 extending from the reformer 1 to the synthesis gas removal means SG10, do not necessarily have to be provided in exactly this arrangement or number. One or more such separators are optionally arranged on the cooling section 17. Unused heat can be absorbed by way of an air cooler 8 and a water cooler or final cooler 9.

A logic unit 40 is connected to, for example, valves, fittings, heat exchangers and/or throughflow regulators of the arrangement 20, and also to a measurement device 30 which comprises at least one sensor unit 31 (for example for detecting temperature, pressure, volumetric flow rate), which can in each case be arranged on one of the fittings. Here, the arrangement of the sensor unit 31 is merely exemplary. In particular, it is also possible for sensor units 31 to be arranged on each of the further installation components.

A two-steam system may in this case be provided in particular by the following components: process gas cooler 3, steam drum 11, KSW evaporator 12 for the KSW evaporation and PK evaporator 4 for the PK evaporation.

Figure 1B:
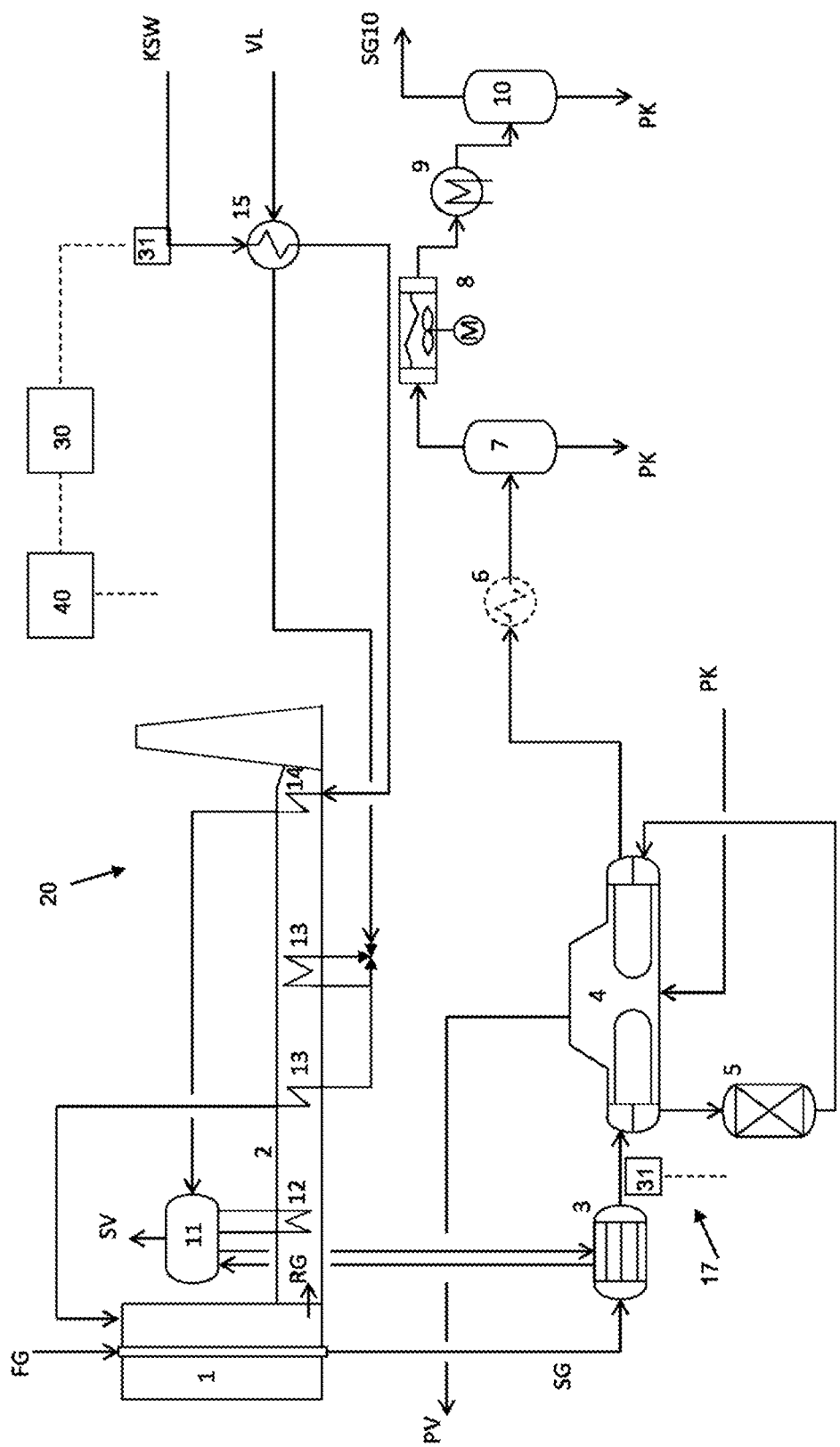
FIG. 1B is a schematic view of a heat recovery arrangement according to one of the exemplary embodiments or the interconnection thereof with an installation.

FIG. 1B shows, in a modification to FIG. 1A, an arrangement in which the heat exchanger 6 may be optionally omitted according to installation configuration.

Figure 2A:
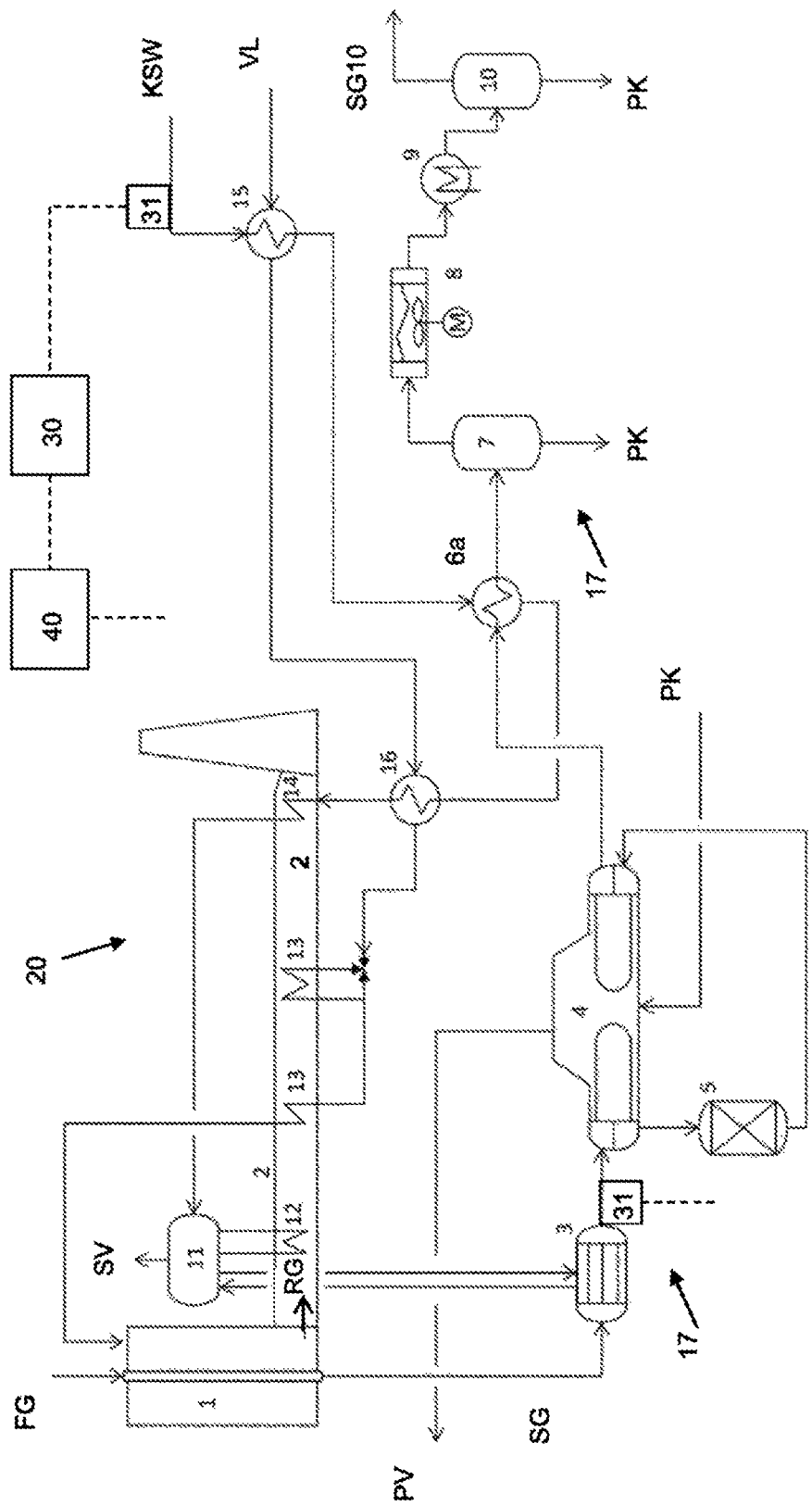
FIG. 2A is a schematic view of a heat recovery arrangement according to a further exemplary embodiment or the interconnection thereof with an installation.

FIG. 2A shows an installation configuration having two calorifiers 15, 16, this arrangement allowing a first, boiler feed water preheating, process on the cooling section 17 and a second, boiler feed water heating, process in the economizer 14 at the end of the flue gas duct 2. The boiler feed water can be heated at two locations, whereby the cooling section 17 is linked to the flow path of the combustion air. FIG. 2A shows, in a modification to FIG. 1A, a KSW preheater 6a and a second calorifier 16 downstream of the KSW preheater 6a. The further process streams, not described here in detail, can be realized or arranged in a manner comparable with the description in FIG. 1A. The arrangement shown in FIG. 2A promises a particularly high saving of energy or a particularly efficient use of low-calorific energy.

Preheating of the boiler feed water may also be assisted by virtue of an additional economizer being arranged in the flue gas duct 2. Optionally, it is also possible to use for example a third calorifier (not illustrated), wherein, between the second calorifier 16 and the third calorifier, the boiler feed water could then be preheated again. Downstream of the KSW preheater 6a, it would thus be possible for a further calorifier and a further KSW preheater to be arranged between the KSW preheater 6a and the separator 7.

Figure 2B:
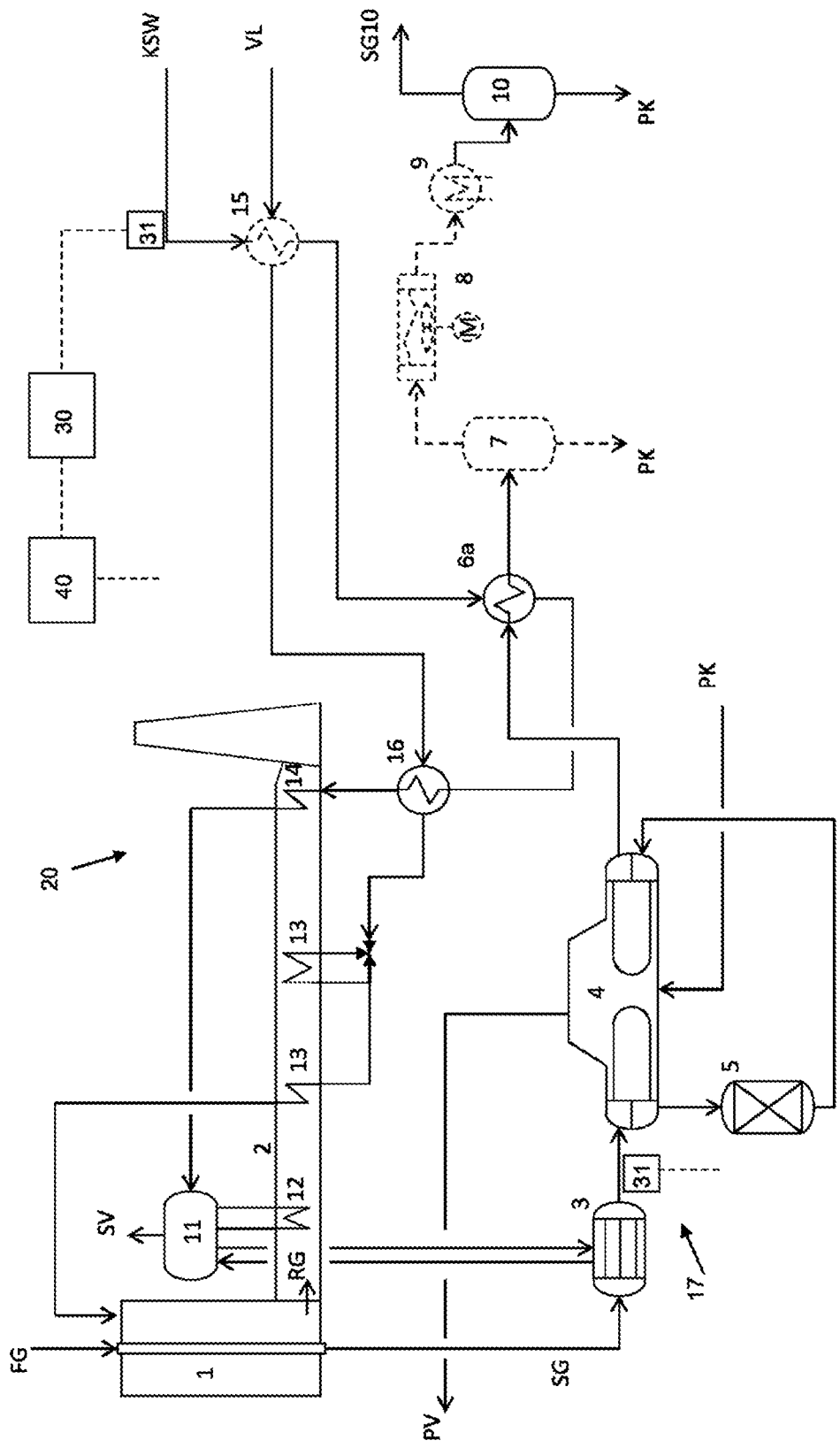
FIG. 2B is a schematic view of a heat recovery arrangement according to a further exemplary embodiment or the interconnection thereof with an installation.

FIG. 2B shows, in a modification to FIGS. 1A, 1B, 2A, an arrangement in which the first calorifier 15 is optionally omitted and further components (illustrated by dashed lines) are also optionally omitted.

Figure 3:
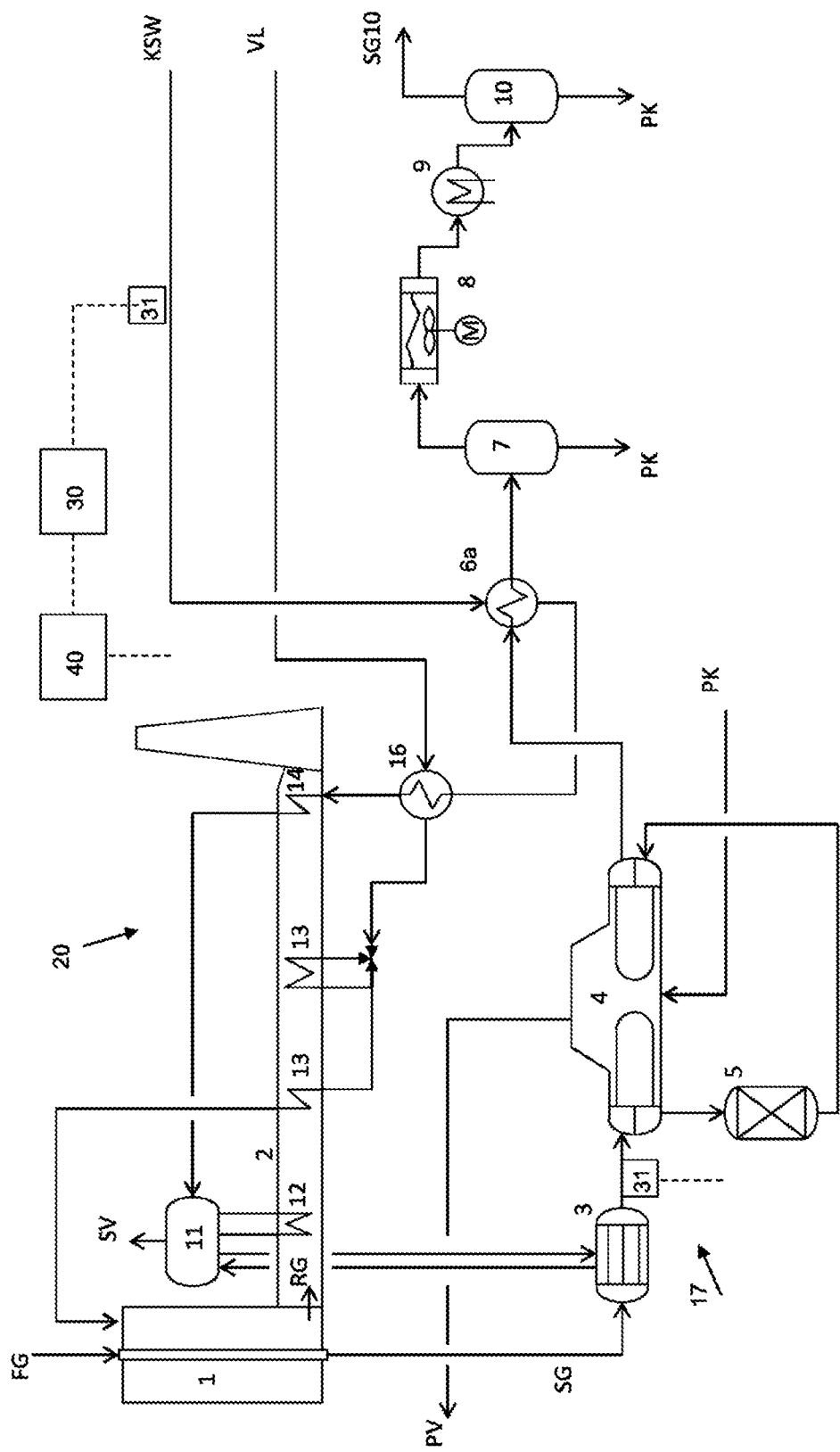
FIG. 3 is a schematic view of a heat recovery arrangement according to a further exemplary embodiment or the interconnection thereof with an installation.

FIG. 3 shows, in a modification to FIGS. 2A, 2B, an arrangement in which the boiler feed water is at any rate firstly conducted to the cooling section 17 for preheating before heat exchange with combustion air is realized.

LIST OF REFERENCE SIGNS

1 Reformer
2 Flue gas duct (convection bank)
3 Process gas cooler
4 PK evaporator, in particular having two bundles
5 CO shift reactor or HTS (high temperature shift) means or MT shift means or HT-LT shift means
6 External heat exchanger (FIGS. 1A, 1B)
6a (External) KSW preheater (FIGS. 2A, 2B; FIG. 3)
7 First separator or PK separator (hot separator)
8 Air cooler
9 Final cooler or water cooler
10 Second separator or PK separator (cold separator)
1 Steam drum (for KSW evaporation)
12 KSW evaporator
13 Internal air preheater arranged in the flue gas duct
14 Economizer or internal preheater for KSW
15 First calorifier, in particular external air preheater
16 Further calorifier, in particular external air preheater (FIGS. 2A, 2B; 3)
17 Cooling section
20 Heat energy recovery arrangement
30 Measurement device
31 Sensor unit
40 Logic unit
FG Feed/steam mixture
KSW Boiler feed water
PK Process condensate
PV Process steam
RG Flue gas
SG Synthesis gas or cracking gas or process gas
SG10 Discharged synthesis gas stream, optionally to the pressure swing adsorption unit (PSA)
SV Saturated steam
VL Combustion air

What is claimed is:

1. A method for heat energy recovery in an installation, comprising:
at least one reformer in a synthesis gas installation having steam reforming means,
wherein at least the following process streams of the installation are interconnected:
combustion air for the reformer,
boiler feed water for steam generation,
process condensate on a cooling section of the installation, and
flue gas from the reformer;
the method comprising:
a) at least partially evaporating the process condensate on the cooling section;
b) recovering heat energy from the flue gas discharged through a flue gas duct;
c) conducting the combustion air through the flue gas duct prior to being supplied to the reformer for recovery of the heat energy;
d) one or both of preheating and evaporating the process condensate on the cooling section for the purpose of heat energy recovery by heat exchange with synthesis gas generated in the installation, and
e) preheating the combustion air by heat exchange by means of the boiler feed water prior to being preheated in the flue gas duct.

2. The method of claim 1, wherein heat transfer from the boiler feed water to the combustion air is realized in that the boiler feed water and the combustion air are conducted through at least one external air preheater arranged externally with respect to the flue gas duct, before the boiler feed water is conducted to the flue gas duct.

3. The method of claim 1, wherein the boiler feed water is conducted via a KSW preheater arranged internally in the flue gas duct and is arranged at the end of the flue gas duct.

4. The method of claim 3, wherein, in the flue gas duct, the flue gas is conducted through at least one air preheater arranged internally in the flue gas duct and is arranged upstream of the KSW preheater arranged internally in the flue gas duct.

5. The method of claim 3, wherein the boiler feed water is heated in at least one external KSW preheater before it is conducted via a further external air preheater, to the flue gas duct, the external KSW preheater arranged on the cooling section by means of process gas.

6. The method of claim 5, wherein, downstream of the external air preheater, the boiler feed water is subdivided into two parallel partial streams for the purpose of preheating the boiler feed water, into a partial stream to the KSW preheater arranged internally in the flue gas duct, and into a partial stream to the external KSW preheater, on the cooling section.

7. The method of claim 1, wherein the cooled boiler feed water exiting the first external air preheater is reheated and then conducted to a further external air preheater, in which heat exchange with the combustion air is again realized.

8. The method of claim 3, wherein the KSW preheater is a heat exchanger which is arranged on the cooling section and via which synthesis gas generated in the installation is conducted.

9. The method of claim 1, wherein the preheating or evaporation of the process condensate on the cooling section is realized in a boiler evaporator, which comprises two heat exchanger units and a common steam chamber.

10. A heat energy recovery arrangement for installations, comprising:
at least one reformer for synthesis gas installations having steam reforming means, in which installations at least the following process streams of the installation are interconnected:
combustion air for the reformer,
boiler feed water for steam generation,
process condensate on a cooling section of the installation, and
flue gas from the reformer, which flue gas is discharged through a flue gas duct;
wherein the heat energy recovery arrangement comprises:
at least one air preheater for the combustion air, which is arranged externally with respect to the flue gas duct;
at least one heat exchanger for the process condensate or the boiler feed water;
a heat exchanger for the process condensate arranged on the cooling section and configured for heat energy recovery by way of heat exchange with synthesis gas generated in the installation, and
wherein the external air preheater is configured and arranged for heat exchange between the boiler feed water and the combustion air prior to the preheating thereof in the flue gas duct.

11. The heat energy recovery arrangement of claim 10, wherein the heat exchanger for the process condensate is a boiler evaporator, which comprises two bundles and a common steam chamber.

12. The heat energy recovery arrangement of claim 10, wherein at least one KSW preheater is arranged internally in the flue gas duct, downstream at the end of the flue gas duct, the KSW preheater arranged in the flow path of the flue gas.

13. The heat energy recovery arrangement of claim 12, wherein a further external air preheater is arranged upstream of the internal KSW preheater; and/or a boiler feed water preheater is arranged on the cooling section, which is configured for heat exchange between the boiler feed water and process gas, downstream of the external air preheater.

14. The heat energy recovery arrangement of claim 10, further comprising a logic unit configured to control volumetric flow rates or for the switching of installation components at an external air preheater through which boiler feed water and combustion air are conducted for preheating the combustion air.

* * * * *